Sept. 20, 1966
D. H. NORTON ETAL
3,273,279
FISH LURE HOLDER
Filed Dec. 3, 1964
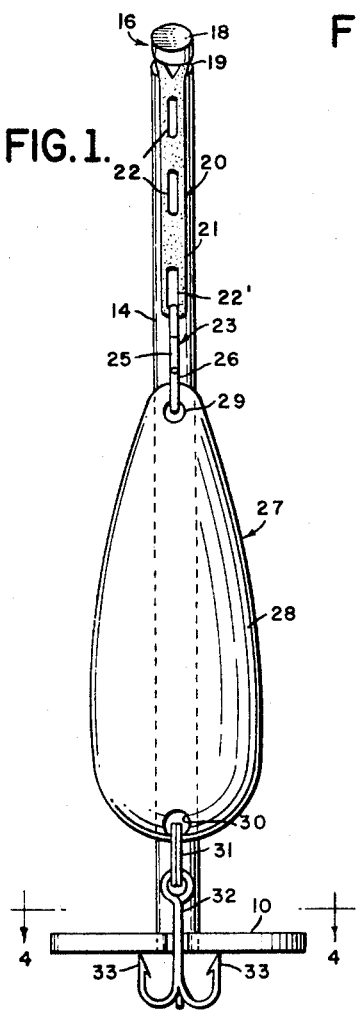
FIG. 1.
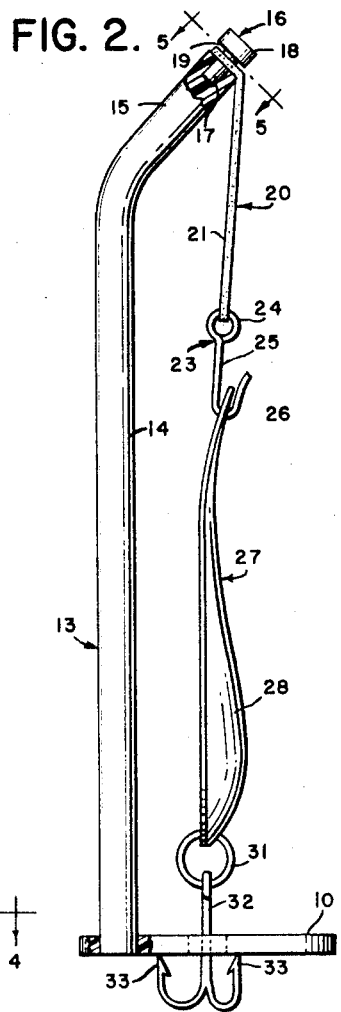
FIG. 2.
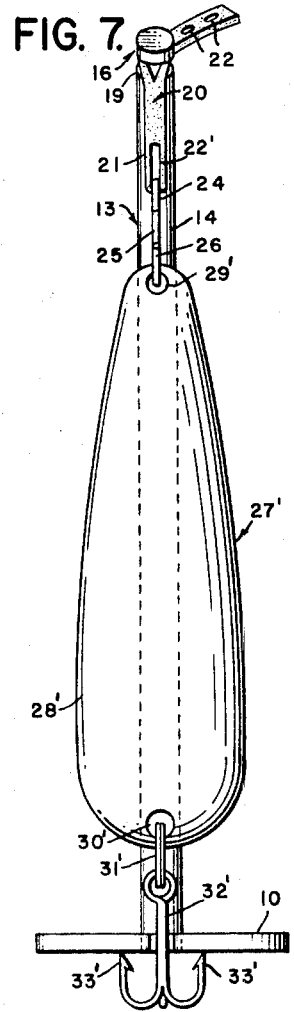
FIG. 7.
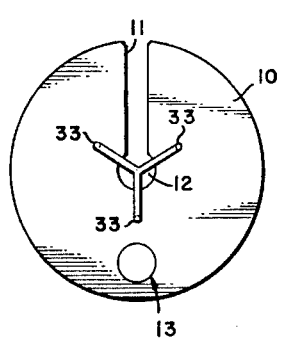
FIG. 3.
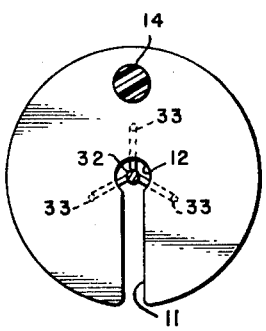
FIG. 4.
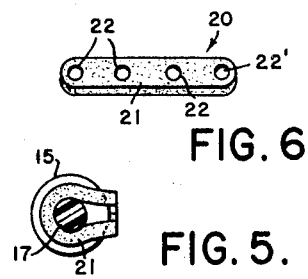
FIG. 6.
FIG. 5.
INVENTORS
DESMOND H. NORTON
MARTIN A. HARDIN
BY *Garvey & Garvey*
ATTORNEYS 3,273,279
FISH LURE HOLDER
Desmond H. Norton, 1122 Patterson St., Ogden, Utah, and Martin A. Hardin, Ogden, Utah (1790 South 50 West, Bountiful, Utah)
Filed Dec. 3, 1964, Ser. No. 415,606
2 Claims. (Cl. 43—54.5)

This invention relates to fish lure holder. It is an object of this invention to provide a holder for one or several fish lures, to prevent the lures from becoming entangled when placed in a tackle box.

Another object of the invention is to provide a fish lure holder wherein the hook barbs of the lure are engaged with a portion of the holder and the opposite end of the lure is connected to a holder portion which exerts a constant upward pressure on the lure to prevent accidental disengagement of the hook barbs from the hook-supporting portion.

A further object is to provide a lure holder of the character described, wherein the portion exerting a constant upward pressure on the lure is resilient and includes means for adjusting the position thereof to effect use of the holder for lures of various sizes.

A still further object is to provide a lure holder consisting of a few parts which may be readily and economically made and assembled, the holder requiring a minimum of storage space.

Other objects of the invention will be manifest from the following description of the preferred form of the invention, taken in connection with the accompanying drawings, wherein:

FIG. 1 is a front elevational view of the lure holder of the present invention, illustrating its application;

FIG. 2 is a side elevational view of the same;

FIG. 3 is a bottom plan view of the lure holder;

FIG. 4 is a sectional view taken on the lines 4—4 of FIG. 1, looking in the direction of the arrows;

FIG. 5 is a sectional view taken along the lines 5—5 of FIG. 2, looking in the direction of the arrows;

FIG. 6 is a plan view of the resilient member forming a part of the present invention; and FIG. 7 is a view similar to FIG. 1, illustrating the use of the lure holder for a different sized lure.

Referring now in greater detail to the drawings, the present lure holder includes a base 10 of disk-shape which is provided with a radial slot 11 terminating in a central circular opening 12. A supporting member 13 is embedded in any suitable manner in base 10 and is preferably positioned in opposed relation to radial slot 11 as shown to advantage in FIGS. 3 and 4. Supporting member 13 preferably includes an elongated vertical cylindrical portion 14 of any suitable length, the upper terminal of which issues into an angular portion 15 which extends upwardly and inwardly of base 10, the angular portion lying in the same vertical plane as radial slot 11.

The upper terminal of angular portion 15 is adapted for the reception of a terminal cap 16, including a stem 17, the major portion of which is fixedly inserted into the terminal of angular portion 15. The outer terminal of stem 17 is enlarged to form a head 18 which is of substantially the same diameter as angular portion of supporting member 13. Head 18 is spaced from the terminal of angular portion 15 to provide an annular recess 19.

The lure holder of the present invention further includes a resilient member 20 adapted for engagement with a terminal of the lure. As shown in FIG. 6, a resilient member 20 includes an elastic strip 21 provided with a plurality of longitudinally spaced circular perforations 22, one terminal perforation being designated 22'. Referring now to FIGS. 1 and 2, it will be seen that perforation 22' is adapted to hold a lure-retaining hook 23. Hook 23 includes an eye 24, which passes through perforation 22', a shank 25 depending from the eye, and a bill 26 for engagement with the lure. As shown in FIGS. 1 and 2, resilient member 20 is engaged with angular portion 15 by inserting cap 16 through selected perforation 22 so that the portion of elastic strip 21 defining the perforation is engaged with the periphery of stem 17 at the locus of annular recess 19.

The holder of the present invention is adapted for use with a variety of lures such as the illustrated spoon 27. Spoon 27 includes a body portion 28 having a circular opening 29 at its upper end through which bill 26 of lure-engaging hook 23 is adapted to pass. The lower terminal of body portion 28 is also provided with a circular opening 30 through which a hook-supporting eye 31 is trained. A fish hook 32 depends from hook-supporting eye 31, the hook being provided with a plurality of upwardly directed barbs 33.

In engaging spoon 27 to the lure holder of the present invention, the shank of fish hook 32 is passed through radial slot 11 to circular opening 12 and bill 26 of hook 23 is passed through opening 29 of the body portion of the spoon. Resilient member 20 is pulled upwardly to force barbs 33 against the underface of base 10, the resilient member being stretched so that perforations 22 are distended to an elliptical shape. When sufficient retaining force has been exerted on spoon 27, cap 16 is passed through selected perforation 22 and the resilient member is held in engagement with stem 17 at the locus of annular recess 19.

It will be noted from a consideration of FIG. 2, that the lure is held in spaced relation to vertical portion 14 of supporting member 13 and, if desired, one or more additional lures of comparable size may be hooked onto the lure holder.

When it is desired to remove the lure from the lure holder, it is only necessary that a downward force be exerted on lure body 28 against the tension of resilient member 20, thereby freeing barbs 33 from engagement with the underface of base 10. Hook 32 may then be passed through radial slot 11 following which the upper portion of lure body 28 may be removed from hook bill 26.

In FIG. 7 there is illustrated a lure 27' which is similar to, but larger than, lure 27 illustrated in FIGS. 1 and 2. Portions of this lure corresponding to the respective parts of lure 27 are identified by like, primed numbers. It will be noted that in accordance with the present invention, proper securement of lure 27' is effected by inserting cap 16 through the perforation 22 adjacent perforation 22' thereby exerting sufficient force on spoon 27' to prevent accidental disengagement thereof from the lure holder.

The holder of the present invention may be made of any suitable material, a plastic, non-corrosive material such as styrene being preferred. By virtue of the few parts required, the present holder may be economically and readily manufactured and assembled, the holder entity being so designed to require a minimum of storage space. It is also to be understood that the present holder may be made in various sizes as desired and each holder may be adapted for retaining a plurality of sizes of lures in a manner herein illustrated and described. Various other changes may be made within the scope of the claims hereto appended.

What is claimed is:

1. A fish lure holder comprising a base having a slot extending inwardly from a peripheral edge thereof, through which slot the shank of a fish lure hook is passed to permit engagement of the hook barbs with the underface of the base, a supporting member extending upwardly from said base, and resilient means engaged with the upper extremity of said supporting member and depending downwardly for tensioned engagement with the upper end of the lure to maintain the lure hook in engagement with the underface of said base, wherein said resilient means includes an elastic member having a plurality of longitudinally spaced perforations, the perforations being adapted for selective engagement over the upper extremity of said supporting member to adapt the lure holder for use with lures of various sizes.

2. A fish lure holder comprising a circular base having a radial slot therein adapted for the reception of the shank of a lure hook, a vertical support, one end of said support being fixed to said circular base in opposed relation to the radial slot, the upper portion of said vertical support being bent upwardly and inwardly with respect to said base to form an angular support portion lying in the same vertical plane as the radial slot of said base, a peripheral annular recess near the upper terminal of said angular support portion and a resilient member adapted for engagement with said angular support portion, said resilient member including an elongated elastic strip provided with a plurality of longitudinally spaced perforations, a hook secured to the one end of said resilient member for engaging the lure and exerting an upward force thereon to maintain the lure hook barbs in engagement with the underface of said circular base, the perforations of the elastic strip being selectively placed over the upper terminal of said angular support portion at the locus of the annular recess.

References Cited by the Examiner

UNITED STATES PATENTS

| | | | |
|---|---|---|---|
| 742,040 | 10/1903 | Kurtz | 43—57.5 |
| 2,629,964 | 3/1953 | Thunell | 43—57.5 |
| 2,846,806 | 8/1958 | Gaines | 43—54.5 |
| 3,053,006 | 9/1962 | Horner | 43—54.5 |

SAMUEL KOREN, *Primary Examiner.*

D. J. LEACH, *Assistant Examiner.*